United States Patent [19]

Borgendale et al.

[11] Patent Number: 4,783,759
[45] Date of Patent: Nov. 8, 1988

[54] FLOATING COMMAND LINE

[75] Inventors: Kenneth W. Borgendale, Gaithersburg, Md.; Paul S. Cheng, Tokyo, Japan; Kenneth A. Zaiken, Germantown, Md.

[73] Assignee: International Business Machines Corporation, Armonk, N.Y.

[21] Appl. No.: 905,356

[22] Filed: Sep. 9, 1986

[51] Int. Cl.[4] ............................................. G06F 9/00
[52] U.S. Cl. .................................................... 364/900
[58] Field of Search ................................. 364/200, 900

[56] References Cited

U.S. PATENT DOCUMENTS

| | | | |
|---|---|---|---|
| 4,454,592 | 6/1984 | Cason et al. | 364/900 |
| 4,458,331 | 7/1984 | Amezcua et al. | 364/900 |
| 4,481,603 | 11/1984 | McCaskill et al. | 364/900 |
| 4,672,575 | 6/1987 | Stephens | 364/900 |

*Primary Examiner*—Gareth D. Shaw
*Assistant Examiner*—John G. Mills

*Attorney, Agent, or Firm*—John E. Hoel

[57] ABSTRACT

A text processing system is disclosed including an improved method for entering and displaying commands from a keyboard. Normal text being typed in is displayed at a sequentially advancing text cursor position. The user can press a command function-key on the keyboard, signifying that he desires to type in a command word. In response to this, the present position of the text cursor is saved and a command line window is displayed at a position proximate to the saved text cursor position on the display. Then, when a command word is typed in at the keyboard, it is displayed within this floating command line window. This enables the operator to continue to focus his attention in the central portion of the display where he was preparing his text, while entering and observing the display of his typed-in command. In this manner, the operator's attention is not interrupted by having to redirect his attention to either the upper extremity or the lower extremity of the display device.

2 Claims, 5 Drawing Sheets

FIG. 2.

```
DWSAMPLE RFT            F1                                              PAGE 1
                                                                        LINE 0
===>
<---+----|----+----2----+----3---V+----4----+----5----+----6----+--->--7
                                                                    --- PAGE 1
TO: ALL STAFF

FROM: PLANNING OFFICE

SUBJECT: QUARTERLY BUSINESS MEETING

DATE: SEPTEMBER 23, 1985
                                      220
                                       ↙
THIS YEAR THE CORPORET DIVISION)HAS SCHEDULED THE AUTUMN QUARTERLY
                               222
MEETING FOR FRIDAY, OCTOBER 23, IN WOLVERHAMPTON, U.K. SO THAT WE
MIGHT ALL PREPARE FOR THIS []MPORTANT MEETING, THE PLANNING OFFICE
HAS COMPILED THE FOLLOWING "MINI-REPORT" ON ONE AREA CONSIDERED
VITAL TO THE COMPANY'S GROWTH: INTERNATIONAL DEVELOPMENT.

WE HOPE THE REPORT WILL HELP PREPARE YOU FOR SOME OF THE MAJOR
DISCUSSIONS SCHEDULED TO TAKE PLACE AT THE QUARTERLY MEETING. YOU
PF 1=HELP       2=INSERT       3=QUIT       4=INSTR.      5=RFIND     6=AID
PF 7=UPCURS     8=DOWNCURS     9=BLOCK     10=COMMAND    11=NEXT     12=CMDLINE
                                                ↖
                                                 224
```

FIG. 3.

```
DWSAMPLE RFT                    FI                                                    PAGE 1
                                                                                      LINE 0
===>
<---+----1----+----2----+----3----+----4----+----5----+----6----+---->-7----+-------
                                     -V+                                           -- PAGE 1

TO: ALL STAFF

FROM: PLANNING OFFICE

SUBJECT: QUARTERLY BUSINESS MEETING

DATE: SEPTEMBER 23, 1985
                           222          220
THIS YEAR THE CORPORET DIVISION HAS SCHEDULED THE AUTUMN QUARTERLY
MEETING FOR FRIDAY, OCTOBER 23, IN WOLVERHAMPTON, U.K. SO THAT WE
MIGHT ALL PREPARE FOR THIS [I]MPORTANT MEETING, THE PLANNING OFFICE
```

```
                                                                      226
DISCUSSIONS SCHEDULED TO TAKE PLACE AT THE QUARTERLY MEETING. YOU
ENTER A COMMAND:
===>
```

```
PF 1=HELP    225   2=INSERT      3=QUIT     4=INSTR.    5=RFIND    6=AID
PF 7=UPCURS       8=DOWNCURS     9=BLOCK   10=COMMAND  11=NEXT    12=CMDLINE
```

FIG. 4.

```
DWSAMPLE RFT                    F1                                          PAGE 1
                                                                            LINE 0
===>
<---+---1_---+---2_---+---3_--V+_---4_---+---5_---+---6_---+>--7_---+---
                                                                    PAGE 1
TO: ALL STAFF

FROM: PLANNING OFFICE

SUBJECT: QUARTERLY BUSINESS MEETING

DATE: SEPTEMBER 23, 1985
                    222
THIS YEAR THE CORPORET DIVISION HAS SCHEDULED THE AUTUMN QUARTERLY
MEETING FOR FRIDAY, OCTOBER 23, IN WOLVERHAMPTON, U.K. SO THAT WE
MIGHT ALL PREPARE FOR THIS [I]MPORTANT MEETING, THE PLANNING OFFICE
 ┌─────────────────────┐
 │ ENTER A COMMAND:    │
 │ ===> SYNONYMS_      │                                              226
 └─────────────────────┘
DISCUSSIONS SCHEDULED TO TAKE PLACE AT THE QUARTERLY MEETING. YOU
PF 1=HELP    228    2=INSERT      3=QUIT       4=INSTR.    5=RFIND     6=AID
PF 7=UPCURS  225  8=DOWNCURS      9=BLOCK     10=COMMAND  11=NEXT     12=CMDLINE
```

FIG. 5.

```
DWSAMPLE RFT                    F1                                                    PAGE 1
                                                                                      LINE 0
===>
<---+---1---+---2---+---3--V+---4---+---5---+---6---+->-7
 _   _   _   _   _   _   _                             --- PAGE 1
```

TO: ALL STAFF

FROM: PLANNING OFFICE

SUBJECT: QUARTERLY BUSINESS MEETING

DATE: SEPTEMBER 23, 1985

THIS YEAR THE CORPORET DIVISION) HAS SCHEDULED THE AUTUMN QUARTERLY
MEETING FOR FRIDAY, OCTOBER 23, IN WOLVERHAMPTON, U.K. SO THAT WE
MIGHT ALL PREPARE FOR THIS [I]MPORTANT MEETING, THE PLANNING OFFICE
HAS COMPILE
VITAL TO TH   ┌─────────────────────────────────────────────────────┐
WE HOPE THE   │ SYNONYMS FOR THE WORD "IMPORTANT":                  │
DISCUSSIONS   │ ADJECTIVE:                                          │
PF1=HELP      │  -   BIG, CONSEQUENTIAL, CONSIDERABLE, HISTORIC, LARGE, MATERIAL, │
PF7=UPCURS    │      MEANINGFUL, MOMENTOUS, SIGNIFICANT, SUBSTANTIAL, WEIGHTY │
              │  -   INFLUENTIAL, CONSEQUENTIAL, POWERFUL, WEIGHTY  │
              └─────────────────────────────────────────────────────┘
                                                    230

222                220

FLOATING COMMAND LINE

BACKGROUND OF THE INVENTION

1. Technical Field

The invention disclosed broadly relates to information processing and more particularly relates to improvements in text processing.

2. Background Art

Test processing and word processing systems have been developed for both stand-alone applications and distributed processing applications. The terms text processing and word processing will be used interchangeably herein to refer to data processing systems primarily used for the creation, editing, communication and/or printing of alphanumeric character strings composing written text. A particular distributed processing system for word processing is disclosed in the copending U.S. patent application Ser. No. 781,862, filed Sept. 30, 1985, entitled "Multilingual Processing for Screen Image Build and Command Decode in a Word Processor, with Full Command, Message and Help Support," by K. W. Borgendale, et al. The figures and specification of the Borgendale, et al. patent application are incorporated herein by reference, as an example of a host system within which the subject invention herein can be applied.

In the prior art, the operator sits at a keyboard and enters commands and text which are stored in the processor's memory. The processor's memory contains stored program instructions for carrying out the word processing functions and also contains a working area for processing the text entered by the operator. As the text is entered at the keyboard, it is displayed on a cathode ray tube-type display device at a sequentially advancing text cursor position. Commands are typically entered by either pressing a command function-key which has been preprogrammed to initiate a particular command function, or alternately the operator directs the cursor which is displayed on the diplay screen, into a command line area. When the cursor enters the command line area, any characters typed at the keyboard are interpreted by the word processing system as a command and the system will respond by performing the indicated command function. In the prior art, the command line is a stationary area located at either the bottom of the display screen or at the top of the display screen. The location of the command line at either the upper or lower extremity of the display screen causes the operator to change his location of concentration from the text which he is creating at the text cursor position, to either the upper or the lower extremity of the display. This creates an interruption in the operator's attention, which is an undesirable result. Still further, after the word processing system has completed the execution of the command entered by the operator, the operator may be required to redirect the cursor to the previous position within the text which was left at the time the command was entered on the command line. This is still another disadvantage since it imposes a number of inconvenient steps which must be carried out by the operator.

U.S. Pat. No. 4,458,331 to Amezcua, et al. describes a mechanism for sharing a status line between foreground and background tasks. U.S. Pat. No. 4,481,603 to McCaskill, et al. provides predefined fields for entering data into structured records. U.S. Pat. No. 4,454,592 to Cason, et al. provides a prompt area for prompting the user to supply a complete data input. But none of this prior art recognizes or solves the problem of disrupting the operator's attention by requiring the entry of command words displayed at command line locations on the upper or lower extremity of the display screen.

OBJECTS OF THE INVENTION

It is therefore an object of the invention to provide an improved text processing system.

It is a further object of the invention to provide an improved technique for displaying commands entered at the keyboard of a text processing system.

It is yet a further object of the invention to provide an improved method of entering commands in a word processing or a text processing system, which avoids requiring the operator to focus his attention away from the working area of the text while entering commands on a command line.

SUMMARY OF THE INVENTION

These and other objects, features and advantages of the invention are achieved by the floating command line method disclosed herein. In a text processing system including a memory for storing program instructions in a working area, a keyboard for entering commands and text and a display device for displaying the commands and text entered at the keyboard, the invention comprises an improved method for entering and displaying commands from the keyboard, which are to be executed by the system. The method includes the step of displaying text on the display device, which is entered at a sequentially advancing text cursor position from the keyboard. The method further includes the step of receiving a command function-key signal from the keyboard, signifying that the user desires to type in a command at the keyboard. The method further includes the step of saving the present position of the text cursor. Then, in accordance with the invention, a command line window is displayed at a position proximate to the saved cursor position on the display. Then, when a command word is typed in at the keyboard, it is displayed within the command line window at the position proximate to the saved cursor position on the display. This enables the operator to continue to focus his attention in the central portion of the display where he was preparing his text, while entering and observing the display of his typed-in command. The method continues by removing the command line window from the display and executing the command word which was typed-in at the keyboard. The execution of the command word may include the display of subsequent windows containing additional information as a part of the commanded function to be executed. At the end of the execution of the command, the system returns to the step of displaying the text on the display device, with the text cursor being displayed at the stored position. In this manner, the operator's attention is not interrupted by having to redirect his attention to either the upper extremity or the lower extremity of the display device. Still further, the operator need not carry out additional steps of replacing the cursor at the previous position within the body of the text, the cursor being automatically replaced at that position after the execution of the typed-in command.

BRIEF DESCRIPTION OF THE DRAWINGS

These and other objects, features and advantages of the invention will be more fully appreciated with reference to the accompanying figures.

FIG. 2 is a view of the display screen during step 200, displaying text during ordinary word processing text creation activities.

FIG. 3 illustrates the display screen of FIG. 2, where step 206 takes place, following te operator's having pressed the command key 224, the command line window 226 is displayed at a location proximate to the text cursor position 222.

FIG. 4 is a subsequent view of the display screen during step 208, where the command word 228 is displayed within the command window 226, after entry at the keyboard.

FIG. 5 is a subsequent view of the display screen during step 212, during which the command word is being executed, the particular command in this case being the request for the display of synonyms within the window 230.

DESCRIPTION OF THE BEST MODE FOR CARRYING OUT THE INVENTION

Figure 1:
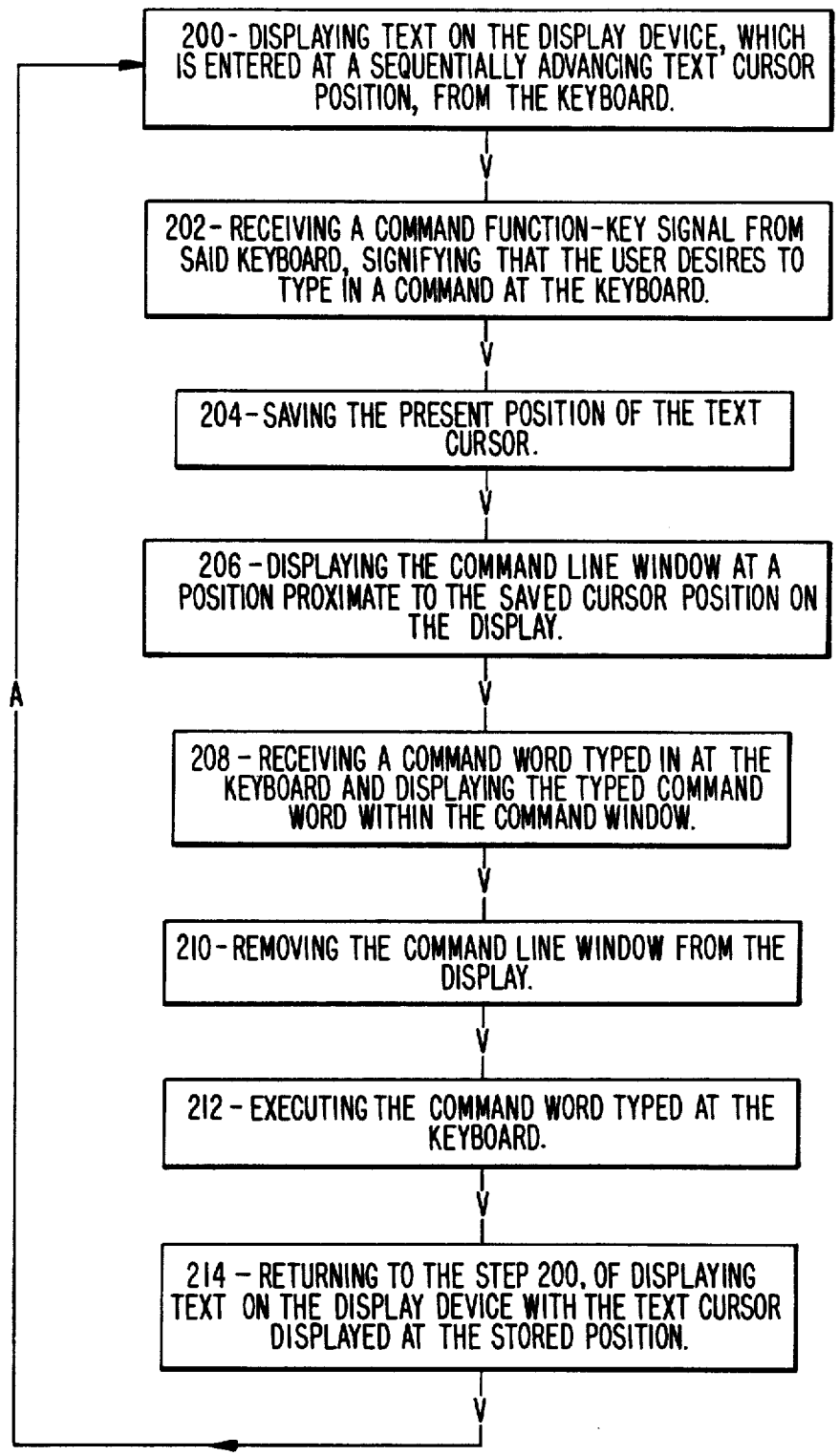
FIG. 1 is a flow diagram of the invention.

The floating command line invention finds application in the distributed data processing system described in U.S. Pat. No. 4,731,735, filed Sept. 30, 1985, entitled "Multilingual Processing for Screen Image Build and Command Decode in a Word Processor, with Full Command, Message and Help Support," by K. W. Borgendale, et al.

In the Borgendale, et al. copending patent application, a host data processing system is described which includes a workstation 16 having a display screen 17 and a keyboard 15, connected to a host data processor 10. Within the host data processor 10, there is included a memory 30 and an execution unit 32, the execution unit 32 executing stored program instructions contained in the memory 30 to carry out word processing and text processing functions. The terms word processing and text processing will be used interchangeably herein. The memory 30 is disclosed to include a command processor 60 which contains a sequence of stored program instructions to interpret the command words entered by the user and to carry out the functions which are responsive to those command words.

FIG. 1 herein is a flow diagram of stored program instructions which can be stored in the command processor 60 of the memory 30 in the copending Borgendale, et al. patent application. In the flow diagram of FIG. 1 herein, step 200 is the displaying of text on the display device, which is entered at a sequentially advancing text cursor position from the keyboard. Reference to FIG. 2 herein will illustrate the appearance of the display device during step 200, where the working text 220 is entered by the operator from the keyboard at the sequentially advancing text cursor location 222. The keyboard includes a plurality of preprogrammed command keys including the command key labeled "10=Command" which is the command key 224. The command key 224 operates, when pressed by the operator, to provide a signal to the word processing system that the user desires to type in a command at the keyboard. This is represented by step 202 in FIG. 1 herein. When the command key 224 is pressed, step 204 of FIG. 1 saves or stores the present position of the text cursor 222 relative to the origin of coordinates for the display screen. Then, the flow diagram of FIG. 1 has step 206 display the command line window 226 at a position proximate to the saved cursor position 222 on the display screen, as is shown in FIG. 3. The command line window consists of an elongated display area as is shown in FIG. 3, within which a command line cursor 225 is positioned to enable the operator to enter at a sequentially advancing position along the command line, the typed-in command word. In the example shown in FIG. 3, the command line window 226 is positioned with its upper border occupying the line immediately below the text cursor position 222. Alternately, the lower border of the window 226 can occupy the line immediately above the text cursor position 222. Alternately, the border of the window 226 closer to the cursor position 222 can be separated therefrom by several horizontal lines but, in accordance with the invention, it is close enough to be within the field of view of the operator when he makes the transition from normal text entry at the text cursor position 222, to the entry of a command word in the command window 226.

FIG. 1 shows the next step 208 in the flow diagram, where the command word 228 has been typed in at the keyboard and is displayed within the command line window 226, as is shown in FIG. 4. In the present example the command word 228 typed in is "synonyms." Then, in step 210 of FIG. 1, the command line window 226 is removed from the display and, in step 212, the command word which has been typed in at the keyboard, is executed by the command processor 60 in the Borgendale, et al. copending patent application. In the example shown herein, the command word is "synonyms." The command processor interprets this command word 228 as a request by the operator to provide from a stored synonym dictionary, the synonyms for the word "important" at which the stored cursor position 222 was located. FIG. 5 shows the result of executing the command word 228, namely the display of the synonyms for the word "important" within the window 230. After the completion of the execution of the command word 228, the user can optionally press any key on the keyboard and step 214 of the flow diagram of FIG. 1 will return the display of text 220 shown in FIG. 2 on the display screen, with the text cursor being displayed at the text cursor position 222, which was previously saved or stored during step 204.

Table I is an example of a portion of the stored program instructions in the word processing executive 66 of the copending Borgendale, et al. patent application, referred to above, including instructions corresponding to steps 200 and 202 of FIG. 1 herein, to call the command key subroutine in the command processor 60, when the F10 function key 224 is pressed. Table II is an example of the stored program instructions for the command key subroutine corresponding to steps 204 to 214 of FIG. 1, herein. The example programs in Tables I and II are written in the Basic Language for the IBM Personal Computer, as described in the publication "Basic by Microsoft Corp.," *IBM Personal Computer Software Reference Library*, IBM Corporation, 1985, publication No. 6025013. These examples programs can be translated into any other conventional program language to run on either a stand-alone computer or on a host computer in a distributed processing system. It is within the scope of the invention, that some of the steps in the flow diagram of FIG. 1 can be placed in a different order. For example step 210, removing the command line window from the display, can be placed after step 212, executing the command word.

The resulting method provides a more convenient technique for entering commands in a text processing or word processing system, requiring fewer operator steps and maintaining greater operator concentration, than has been available in the prior art. Although the implementation of the invention has been disclosed within the context of a distributed word processing system, the invention can also find application in stand-alone word processors.

Although a specific embodiment of the invention has been disclosed, it will be understood by those having skill in the art that changes can be made in the specific embodiment disclosed, without departing from the spirit and the scope of the invention.

TABLE I

MAIN WORD PROCESSING PROGRAM

```
10   '
20   '
30   '    Comments
40   '
50   '    This is the main word processing program which contains stored program
60   '    instructions to carry out conventional word processing operations.
70   '
80   '    Included in this main program are the instructions to call the
90   '    Command Key subroutine at line 1000, when Function Key F10 is pressed.
100  '
110  '    Dimension statements for variables used in the subroutine
120  DIM SAVELINE(4,80)
130  '
140  '    Define function key F10 as the Command Key.
150  '    Every time the program starts a new statement, it checks to see if
160  '    the F10 function key was pressed. If so, the program calls the
170  '    subroutine at line 1000, which is the Command Key subroutine.
180  ON KEY(10) GOSUB 1000
190  KEY(10) ON
200  '
210  '    Other word processing program instructions.
220  '
230  END
```

TABLE II

COMMAND KEY SUBROUTINE

```
1000 '
1010 '
1020 '    Comments
1030 '
1040 '    When the F10 function key is pressed, the main program calls this
1050 '    subroutine to execute the steps 204 to 214 of the flow diagram of
1060 '    FIG. 1.
1070 '
1080 '    In this example, the screen of the display is 80 columns in the
1090 '    horizontal direction and 25 lines in the vertical direction.
1100 '    Column 1 is on the left edge and column 80 is on the right edge.
1110 '    Row 1 is on the top edge and row 25 is on the bottom edge.
1120 '
1130 '    Step 204:
1140 '    Save the present position of the text cursor.
1150 XCURSOR = POS(0)     'Horizontal coordinate (column) of text cursor.
1160 YCURSOR = CSRLIN     'Vertical coordinate (line) of the cursor.
1170 '
1180 '    step 206:
1190 '    Display the command line window.
1200 '
1210 '    Determine whether the cursor is below line 20. If it is, then
1220 '    place the window above the cursor. Otherwise, place the window
1230 '    below the cursor. Y is the line occupied by the top of the window.
1240 IF YCURSOR <= 20 THEN Y = YCURSOR + 1 ELSE Y = YCURSOR - 4
1250 '
1260 '    Save the existing text in the four lines to be occupied by window.
1270 FOR I = 0 TO 3
1280 FOR COL = 1 TO 80
1290 ROW = Y + I
1300 SAVELINE(I,COL) = SCREEN(ROW,COL)
1310 NEXT COL
1320 NEXT I
1330 '
1340 '    Print the command line window on the display screen
1350 '    at lines Y, Y+1, Y+2 and Y+3.
1360 LOCATE Y,1,0
1370 PRINT ".------------------------------------------------------------."
1380 LOCATE Y+1,1,0
1390 PRINT "| Enter a command:                                            |"
1400 LOCATE Y+2,1,0
1410 PRINT "| ===>                                                        |"
```

TABLE II-continued
COMMAND KEY SUBROUTINE

```
1420  LOCATE Y+3,1,0
1430  PRINT "----------------------------------------------------------------."
1440  '
1450  '     Step 208:
1460  '     Place cursor inside command line window and wait for user to type
1470  '     the command word (the string variable "CMD$").
1480  '     As each character of the command word is typed in at the keyboard,
1490  '     it will be displayed within the command line window. When the user
1500  '     presses the "Enter" key, the variable CMD$ will be set equal to the
1510  '     typed-in character string representing the command word.
1520  LOCATE Y+2,8,1
1530  INPUT CMD$
1540  '
1550  '     Step 210:
1560  '     When the user presses the "Enter" key, the program continues by
1570  '     rewriting over the area occupied by the command line window, the
1580  '     four lines of text previously saved in step 206, above.
1590  FOR I = 0 TO 3
1660  ROW = Y + I
1610  LOCATE ROW,1,0
1620  FOR COL = 1 TO 80
1630  PRINT CHR$(SAVELINE(I,COL));
1640  NEXT COL
1650  NEXT I
1660  '
1670  '     Step 212:
1680  '     Executing the command word typed in at the keyboard.
1690  '     The word string represented by CMD$ is compared to the names
1700  '     of the valid command words available in the command processor.
1710  '     An example of some of the possible command words includes:
1720  '     "COPY", "DELETE", "FILE", "SAVE", "SYNONYMS", "UNDO", etc.
1730  '     The example shown in FIG. 4 is the command word "SYNONYMS".
1740  '     When the word string CMD$ compares with one of these valid
1750  '     command words, the program will call a corresponding subroutine
1760  '     to execute that command. An example of calling such
1770  '     subroutines follows:
1780  IF CMD$ =   "COPY"      THEN GOSUB 10000
1790  IF CMD$ =   "DELETE"    THEN GOSUB 11000
1800  IF CMD$ =   "FILE"      THEN GOSUB 12000
1810  IF CMD$ =   "SAVE"      THEN GOSUB 13000
1820  IF CMD$ =   "SYNONYMS"  THEN GOSUB 14000
1830  IF CMD$ =   "UNDO"      THEN GOSUB 15000
1840  '
1850  '     Since in this example, CMD$ = "SYNONYMS", the program will branch
1860  '     to the synonym generation subroutine at line 14000.
1870  '
1880  '     Step 214:
1890  '     After the completing the execution of the command, the program
1900  '     will replace the text cursor at the position in the text which
1910  '     was saved when the F10 function key was pressed.
1920  LOCATE YCURSOR,XCURSOR,1
1930  '
1940  '     Then the command key subroutine returns control to the main program.
1950  RETURN
1960  END
```

What is claimed is:

1. In a text processing system including a memory for storing program instructions and a working area, a keyboard for entering alphanumeric characters representing commands and text and an alphanumeric display device having a display surface divided into a plurality of horizontal character rows for displaying said alphanumeric characters entered at said keyboard, a method for displaying commands entered at the keyboard to be executed by the system, comprising the steps of:

displaying said alphanumeric characters representing text on said display device by displaying each consecutive character as it is entered at the keyboard, at a next consecutive character position, which defines a text cursor position, in a first horizontal character row on said display until the end of a first row is reached at the right side of the display, and displaying the next consecutive character entered thereafter at the left side of the display in a second horizontal character row adjacent to and below said first row;

receiving a command function key signal from said keyboard, signifying that the user desires to type in a command at said keyboard;

identifying the position of a current horizontal character row containing said present text cursor position;

displaying a command line window having a boundary which occupies a horizontal character row adjacent to said current horizontal character row;

receiving the characters of a command word typed at said keyboard and displaying said characters of the command word within said command line window;

executing said command word typed at said keyboard;

whereby the user's attention remains focused in a region adjacent to said present text cursor position while displaying a command word within said command window which has been entered at said keyboard.

2. In a text processing system including a memory for storing program instructions and a working area, a keyboard for entering alphanumeric characters representing commands and text and an alphanumeric display device having a display surface divided into a plurality of horizontal character rows for displaying said alphanumeric characters entered at said keyboard, a method for displaying commands entered at the keyboard to be executed by the system, comprising the steps of:

displaying said alphanumeric characters representing text on said display device by displaying each consecutive character as it is entered at the keyboard, at a next consecutive character position, which defines a text cursor position, in a first horizontal character row on said display until the end of a first row is reached at the right side of the display, and displaying th next consecutive character entered thereafter at the left side of the display in a second horizontal character row adjacent to and below said first row;

receiving a command function key signal from said keyboard, signifying that the user desires to type in a command at said keyboard;

identifying the position of a current horizontal character row containing said present text cursor position;

displaying a command line window having a boundary which occupies a horizontal character row spaced one horizontal character row away from said current horizontal character row;

receiving the characters of a command word typed at said keyboard and displaying said characters of the command word within said command line window;

executing said command word typed at said keyboard;

whereby the user's attention remains focused in a region adjacent to said present text cursor position while displaying a command word within said command window which has been entered at said keyboard.

* * * * *